United States Patent [19]
Rocci et al.

[11] Patent Number: 6,069,320
[45] Date of Patent: *May 30, 2000

[54] CABLE SPLICE PROTECTOR

[75] Inventors: Joseph Rocci, Burr Ridge; David W. Kirby, Lemont, both of Ill.

[73] Assignee: Etcon Corporation, Burr Ridge, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 09/046,460

[22] Filed: Mar. 23, 1998

Related U.S. Application Data

[63] Continuation-in-part of application No. 08/617,563, Mar. 19, 1996, Pat. No. 5,760,332, which is a continuation-in-part of application No. 08/335,111, Nov. 7, 1994, Pat. No. 5,502,280, which is a continuation of application No. 08/100,672, Jul. 30, 1993, abandoned.

[51] Int. Cl.$^7$ .................................................... H01R 13/52
[52] U.S. Cl. ......................... 174/84 R; 174/84 S; 174/93
[58] Field of Search ................................ 174/84 R, 84 S, 174/85, 86, 88 S, 93, 77 R

[56] References Cited

U.S. PATENT DOCUMENTS

| | | | |
|---|---|---|---|
| 457,865 | 8/1891 | Mason | 403/314 |
| 707,055 | 8/1902 | Earl | 174/91 |
| 1,718,817 | 6/1929 | Greene | 174/89 |
| 2,188,755 | 1/1940 | Markuson | 57/6 |
| 2,312,579 | 3/1943 | O'Brien | 174/84 S X |
| 2,688,651 | 9/1954 | Blake | 174/93 |
| 3,041,575 | 6/1962 | Schneider | 439/393 |
| 3,156,887 | 11/1964 | Weikal | 174/77 R X |
| 3,163,904 | 1/1965 | Ziolkowski | 174/84 S X |
| 3,401,371 | 9/1968 | Hammond | 174/84 S X |
| 3,854,003 | 12/1974 | Duret | 174/88 C |
| 3,944,317 | 3/1976 | Oberdiear | 439/610 |
| 4,255,614 | 3/1981 | Channell | 174/93 |
| 4,361,721 | 11/1982 | Massey | 174/77 R X |
| 4,484,022 | 11/1984 | Eilentropp | 174/84 R |
| 4,558,173 | 12/1985 | Gajajiva et al. | 174/86 |
| 4,684,764 | 8/1987 | Luzzi et al. | 174/91 |
| 5,502,280 | 3/1996 | Rocci et al. | 174/84 R |
| 5,606,150 | 2/1997 | Radliff et al. | 174/92 |
| 5,626,490 | 5/1997 | Pitts et al. | 439/404 |
| 5,760,332 | 6/1998 | Rocci et al. | 174/84 R |

FOREIGN PATENT DOCUMENTS

| | | | |
|---|---|---|---|
| 2272115 | 4/1994 | United Kingdom | 174/77 R |

*Primary Examiner*—Kristine Kincaid
*Assistant Examiner*—Chau N. Nguyen
*Attorney, Agent, or Firm*—Banner & Witcoff, Ltd.

[57] ABSTRACT

A cable splice enclosure made up of: (1) a splice enclosure tube having two compressible ends with annular ledges inside the compressible ends; (2) first and second compressible grommets adapted to be inserted into the compressible ends; and (3) two outer shells adapted to be fastened to said first and second compressible ends of the cable splice enclosure tube. The outer shells have an inclined outer end portion that: (1) holds the compressible grommets in abutted relation to the annular ledges; and (2) compresses the compressible ends, which, in turn, radially compresses the grommets to form a watertight seal around the cables to be spliced. In a different embodiment, which is suitable for enclosing butt-splices, the splice enclosure tube has an open compressible end and a closed end. The open compressible end of the butt-splice enclosure tube uses the same parts and works the same as both ends of the splice tube extender.

10 Claims, 3 Drawing Sheets

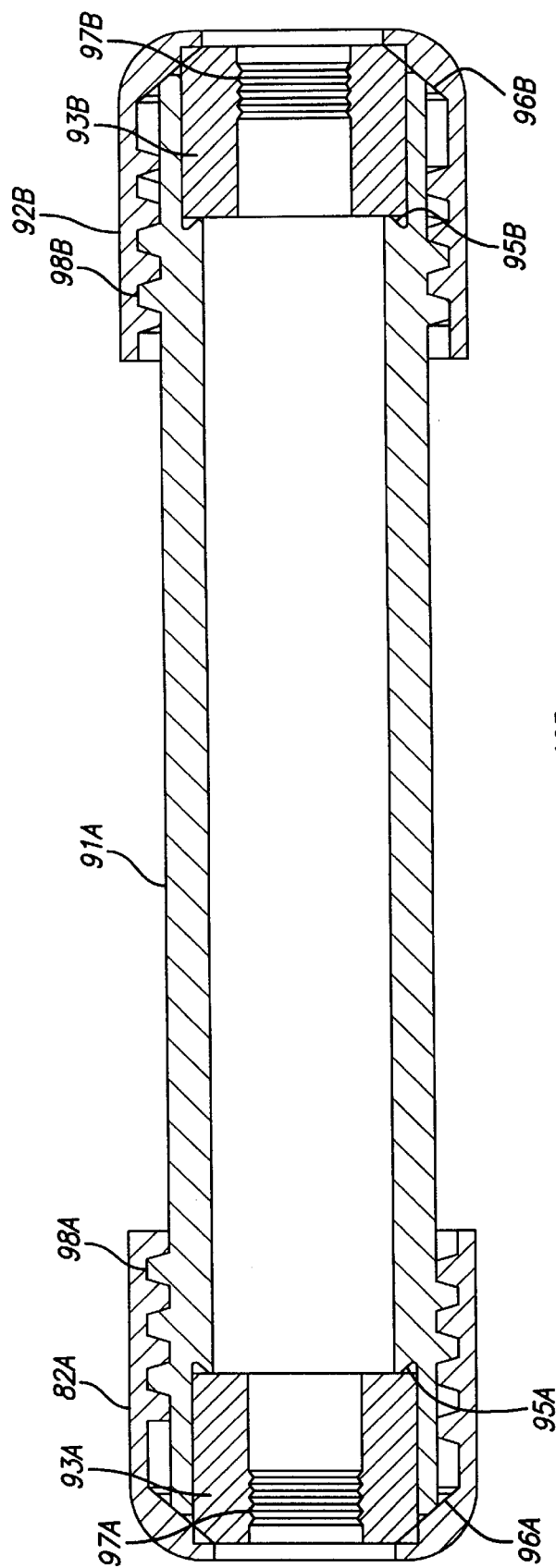
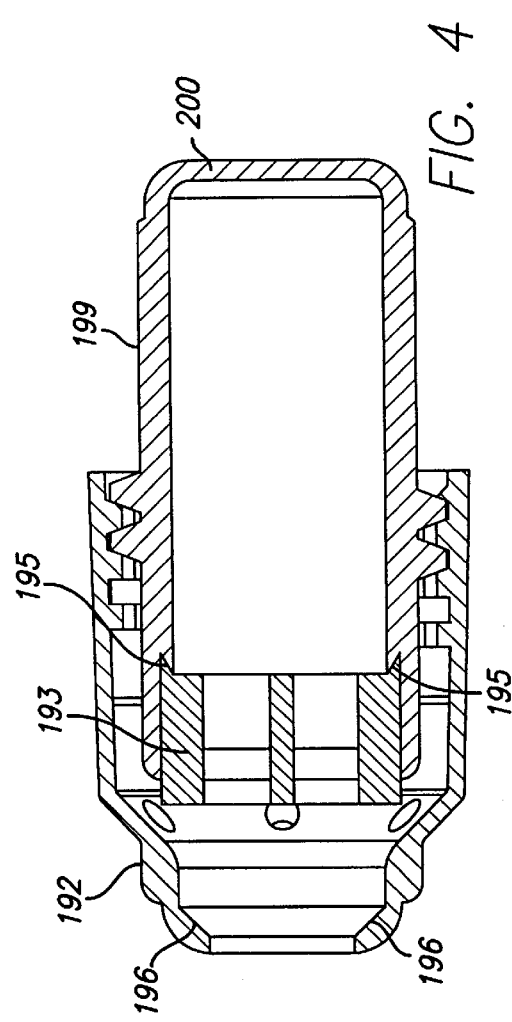
FIG. 2
FIG. 4

CABLE SPLICE PROTECTOR

RELATED APPLICATIONS:

This application is a continuation-in-part of Rocci and Kirby U.S. Ser. No. 08/617,563, filed Mar. 19, 1996 and assigned to Etcon Corporation ("parent application") now U.S. Pat. No. 5,760,332, which is a continuation-in-part of Rocci and Kirby U.S. Ser. No. 08/335,111, filed Nov. 7, 1994 and assigned to Etcon Corporation, now U.S. Pat. No. 5,502,280 ("grandparent application"), which is a continuation of U.S. Ser. No. 08/100,672, filed Jul. 30, 1993, now abandoned.

BACKGROUND OF THE INVENTION

1. Field of the Invention

The present invention relates to cable splice enclosures.

2. Description of the Art

The above-identified grandparent application discloses a splice enclosure comprised of a first outer shell 30, a second outer shell 40, a first inner shell 10 and a second inner shell 20. The first inner shell 10 includes a compressible grommet through which one or more cables pass and the second inner shell 20 includes a compressible grommet through which a second one or more cables pass. The ends of the respective cables are spliced, and thereafter the two outer shells are connected at their inner ends such as by threading one outer shell into the outer end of the other outer shell.

The connecting of the two outer shells causes the outer ends of each of the inner shells to be compressed inwardly thereby compressing the respective grommets around the cables passing therethrough. In addition, the connecting of the two outer shells forces the two inner shells into end-to-end abutment to effect a seal between the abutting inner ends of the two inner shells. In addition, as the two outer housings or shells together, they provide a calibrated amount of compressive force on the two inner shells to allow the installer to provide the desired amount of compression to the splice.

The above-identified parent application also discloses splice enclosures that include two outer shells and two inner shells. In one embodiment, an extender, in the form of a tube, is connected between the two outer shells. Thus, instead of threading one outer shell onto the opposing outer shell, each of the two outer shells is threaded on an opposite end of an intermediate tubular member 80, also referred to as an extender.

SUMMARY OF THE INVENTION

In a preferred embodiment of the invention, compressible grommets provide a watertight closure around each cable end, and the enclosure can easily be reopened even long after the initial installation to add or remove cables.

The two inner shells 12', the extender 80, and the two O-rings 30', which go between the inner shells and the extender 80 in the above-identified parent application, are all replaced by a one-piece splice enclosure tube in one embodiment of the present invention, which reduces the cost of manufacture by reducing the number of components from five to one and eliminates two of the six seals, namely, the two seals between the inner shells 12' and both ends of the extender 80.

In another embodiment of the present invention, the one-piece splice enclosure tube is essentially cut in half, radially, and capped at the end that was cut, thereby forming a butt-splice enclosure tube that has one compressible open end, with external threads, and one closed end.

Both the splice enclosure tube, and the butt-splice enclosure tube may be provided in various lengths and both afford room for connectors to be applied to the ends of cable to be spliced. By way of example, certain types of coaxial cable and telephone cable require relatively large joints where they are spliced and the splice enclosure tube, and the butt-splice enclosure tube, of the present invention will afford the extra space required, while reducing the number of components that must be manufactured thereby reducing manufacturing cost, without loss of any of the advantages of the basic splice enclosure The foregoing and other objects and advantages of the invention will be apparent from the following description of certain preferred embodiments thereof, taken in conjunction with the accompanying drawings.

DESCRIPTION OF THE DRAWINGS

FIG. 2 is a longitudinal sectional view taken through an assembly of the components shown in FIG. 1;

FIG. 4 is a longitudinal sectional view taken through an assembly of the components shown in FIG. 3.

Now, in order to acquaint those skilled in the art with the manner of making and using our invention, we shall describe, in conjunction with the accompanying drawings, certain preferred embodiments of our invention.

DETAILED DESCRIPTION OF THE INVENTION

Figure 1:
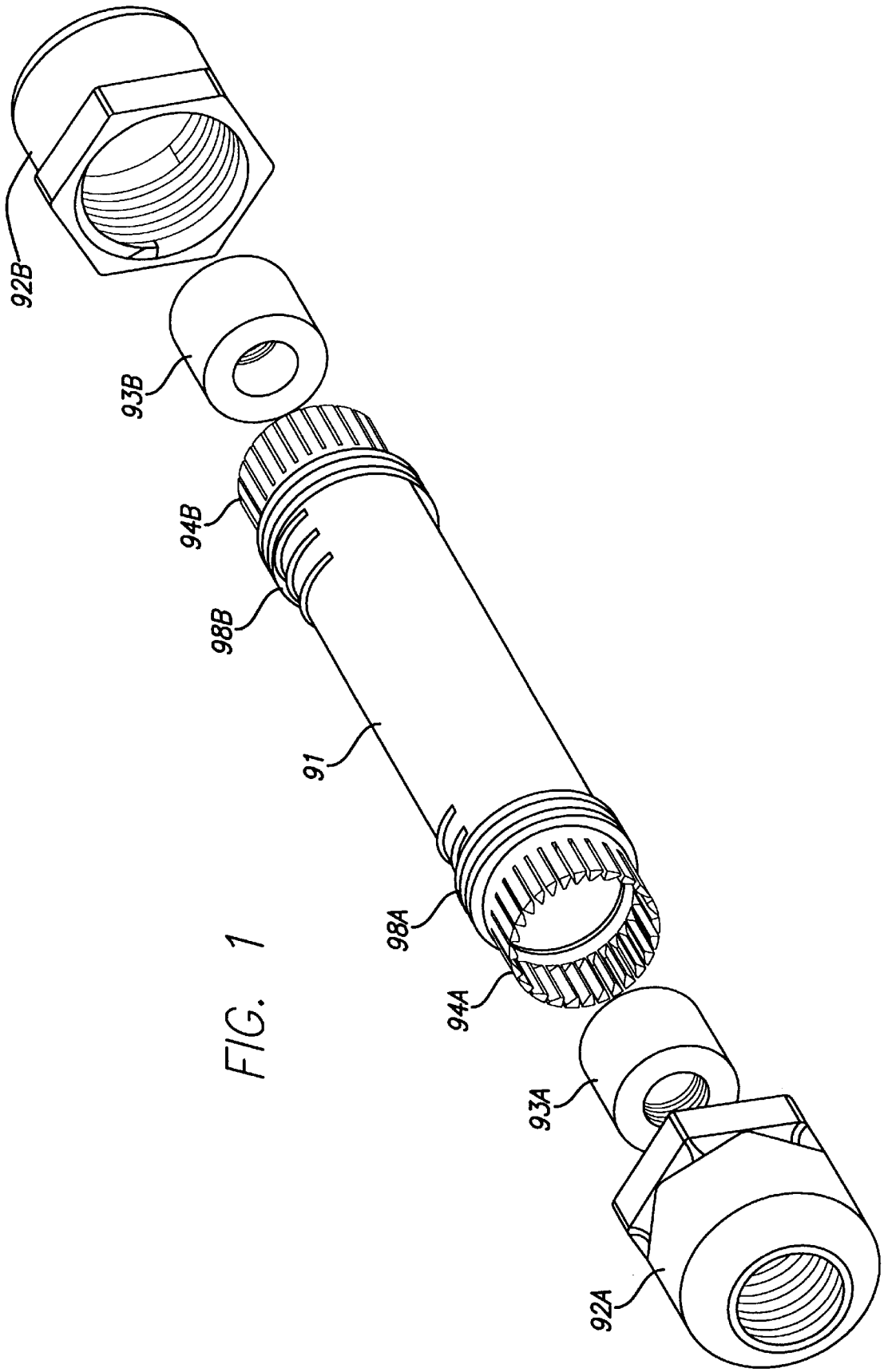
FIG. 1 is a perspective exploded view of a preferred embodiment of this invention including a splice enclosure tube having external threads and a compressible wall at both ends, two compressible grommets, and two outer shells.

FIG. 1 shows an exploded view of a splice enclosure of the type disclosed in the above-identified parent application, except that the inner shells 12', the O-rings 30', and the extender 80 are combined into a one-piece splice enclosure tube 91. Outer shell 92A, compressible grommet 93A, outer shell 92B, and compressible grommet 93B.

The splice enclosure tube 91 includes compressible end 94A and compressible end 94B into which compressible grommets 93A and 93B are inserted. Both compressible grommets have a single hole extending therethrough for passing a cable to be spliced. However, each grommet could have one or more holes therethrough for passing one or more cables to be spliced. The number of holes in any particular grommet will vary depending upon the number of cables to be spliced.

FIG. 2 shows the compressible grommets 93A and 93B pressed into the compressible outer ends 94A and 94B of splice enclosure tube 91 until they rest against annular ledges 95A and 95B which support the grommets. Outer ends of grommet 93 project beyond outer ends of splice enclosure tube 91 such that, as outer shells 92A and 92B are threaded onto splice enclosure tube 91, inclined outer end portions 96A and 96B of outer shell 92A and 92B engage outer ends of grommets 93A and 93B and bias compressible grommets 93A and 93B inwardly against annular ledges 95A and 95B. Also, as outer shells 92A and 92B are threaded onto splice enclosure tube 91, compressible outer ends 94A and 94B of splice enclosure tube 91 are compressed by inclined outer end portions 96A and 96B of outer shells 92A and 92B thereby radially compressing grommets 93A and 93B around cables to be spliced (not shown) to effect watertight seals. As disclosed in the above-referenced grandparent application, preferably, the axial hole or holes in the compressible grommets 93 include one or more scales 97A and 97B, as shown in FIG. 2. Each scale acts as a discrete seal around the circumference of any cable that passes through a compressible grommet.

Splice enclosure tube 91 may be provided in different lengths to provide a desired amount of space for a splicing member to effect splicing of cables which enter into the extender from the opposed outer shells 92. Of course, splicing of such cables must be achieved before the second of the two outer shells 92 is threaded onto an end of the cable splice enclosure tube 91. In its preferred embodiment, the cable splice enclosure tube 91 has constant inside and outside diameters.

Replacing the two inner shells 12', the two o-rings 30', and the extender 80 shown in FIG. 6 of the continuation-in-part parent application by the one-piece cable splice enclosure tube 91 not only reduces the cost of manufacture by reducing the number of components from five to one, but also eliminates two of the six seals formed by the embodiment depicted in FIG. 6 of the parent application, namely, the two seals between the inner shells 12' and both ends of the extender 80.

Figure 3:
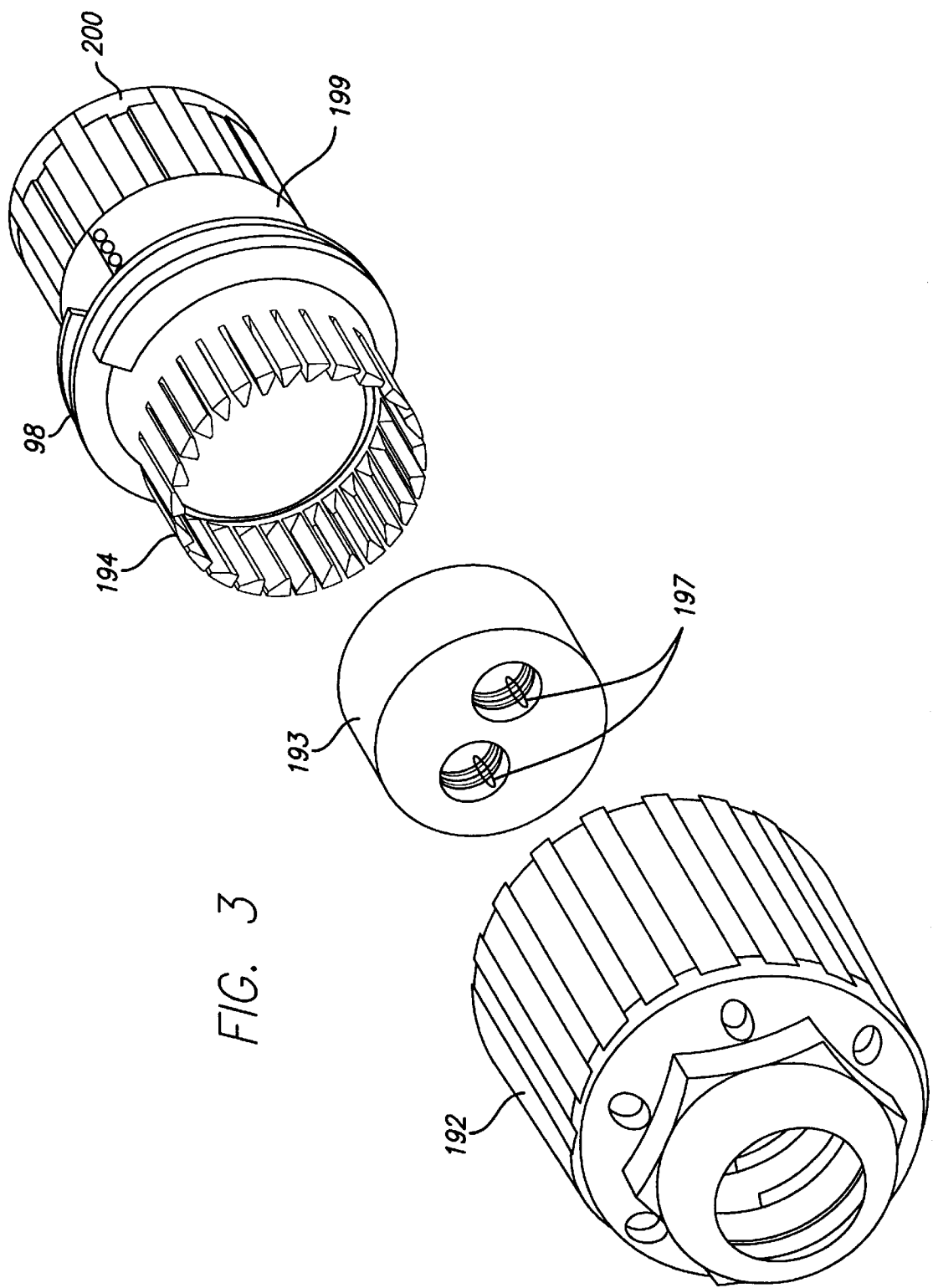
FIG. 3 is a perspective exploded view of a preferred embodiment of this invention including a butt-splice enclosure tube having external threads and a compressible wall at the only open end, one compressible grommet, and one outer shell.

FIG. 3 shows an exploded view of another embodiment of this invention. The embodiment depicted in FIG. 3 is similar to the embodiment depicted in FIGS. 1 and 2, except that the splice enclosure tube 91 is essentially cut in half radially and capped at the end that was cut. Accordingly, there is only one outer shell 192, one compressible grommet 193 with two openings, and the butt-splice enclosure tube 199, which has one compressible end 194, and one closed end 200.

Butt-splice enclosure tube 199 includes one compressible end 194 into which compressible grommet 193 having two openings is inserted. Compressible grommet 193 has two holes extending therethrough for passing two cables to be spliced. However, grommet 193 could have one or more holes therethrough for passing two or more cables to be spliced. The number of holes in any particular grommet will vary depending upon the number of cables to be spliced and the shape of the hole or holes.

FIG. 4 shows compressible grommet 193 which is pressed into compressible outer end 194 of butt-splice enclosure tube 199 until it rests against annular ledge 195. Outer end of grommet 193 projects beyond the outer end of butt-splice enclosure tube 199 such that, as outer shell 192 is threaded onto butt-splice enclosure tube 199, inclined outer end portion 196 of outer shell 192 engages the outer end of compressible grommet 193 and biases compressible grommet 193 inwardly against annular ledge 195. Also, as outer shell 192 is threaded onto butt-splice enclosure tube 199, compressible outer end 194 of butt-splice enclosure tube 199 is compressed by inclined outer end portion 196 of outer shell 192 thereby radially compressing grommet 193 around the cables to be spliced (not shown) to effect watertight seals around the cables. Preferably, axial hole or holes in compressible grommet 193 include one or more scales 197 as shown in FIG. 3. Each scale 197 acts as a discrete seal around the circumference of any cable that passes through compressible grommet 193.

Butt-splice enclosure tube 199 may be provided in different sizes to provide a desired amount of space for a splicing member to effect splicing of cables which enter into butt-splice enclosure tube 199 from outer shell 192. Of course, splicing of such cables must be achieved before outer shell 192 is threaded onto compressible end 194. In its preferred embodiment, butt-splice enclosure tube 199 has constant inside and outside diameters.

For butt-splices, that is, splices in which the cables to be spliced enter the splice enclosure from the same side of the enclosure, as opposed to entering it from opposite sides, the embodiment depicted in FIGS. 3 and 4, which includes butt-splice enclosure tube 99, reduces the cost of manufacture by reducing the number of components for the entire splice enclosure from five, for the embodiment depicted in FIGS. 1 and 2, to three. The embodiment shown in FIGS. 3 and 4 also eliminates one of the four seals formed by the embodiment depicted in FIGS. 1 and 2, namely, the seal between compressible grommet 93B and annular ledge 95B.

This invention may be used with various types of cable such as USE and UF cables. The enclosure can be used for joining any 14 AWG through 250 MCM cable to any other 14 AWG through 250 MCM cable. The embodiment of this invention that includes splice enclosure tube 91 is suitable for enclosing splices of UF (electrical) wire and USE (underground) wire as well as CONEX wire, telephone wire, coaxial cable and fiber optics. For example, splicing or termination of fiber optic conductors requires a large tray where the wire is wound around the tray to avoid sharp bending. Splice enclosure tube 91 provides the space necessary to accommodate such a tray and is particularly advantageous when splicing co-axial cable and fiber optics.

To use the embodiment of this invention that includes cable splice enclosure tube 91 for enclosing a splice of two ends of coaxial cable, an installer would slide outer shell 92A over one cable end and outer shell 92B over the other cable end, then the installer would slide compressible grommet 93A over one cable end and compressible grommet 93B over the other cable end, then the installer would thread either cable end completely through cable splice enclosure tube 91, splice the coaxial cable ends, slide cable splice enclosure tube 91 over the splice, insert compressible grommets 93A and 93B into compressible ends 94A and 94B, and thread outer shells 92A and 92B onto external threads 98A and 98B. As disclosed in the above-identified parent application, by controlled twisting of such outer shells a desired amount of compression can be achieved to provide a watertight enclosure for the splice.

To use the embodiment of this invention that includes butt-splice enclosure tube 199 to enclose a butt-splice of two ends of cable, an installer would slide outer shell 192 over both cable ends, then the installer would slide both cable ends to be spliced through the two openings in the compressible grommet 193, splice the cable ends, insert the spliced cable ends and compressible grommet 193 into compressible end 194, and thread outer shell 192 onto butt-splice enclosure tube 199. By controlled twisting of outer shell 192 relative to butt-splice enclosure tube 199, a desired amount of compression can be achieved to provide a water-tight splice enclosure.

Outer shells 92A, 92B, and 192, splice enclosure tube 91, and butt-splice enclosure tube 199 may be made of engineering grade, polymer-based material which resists moisture, petroleum based products, chemicals and rodents. There is no mixing of compounds, laborious taping, messy gels or dangerous "heat shrinking" flames.

What is claimed is:

1. A cable splice enclosure comprising, in combination:

a splice enclosure tube having first and second compressible ends, both of said compressible ends containing an annular ledge;

first and second compressible grommets adapted to be inserted into said first and second compressible ends; and first and second outer shells adapted to be fastened to said first and second compressible ends, both of said outer shells having an inclined outer end portion that cooperates with said compressible ends to radially compress said compressible ends thereby radially compressing said compressible grommets, said inclined outer end portions holding said compressible grommets in abutted relation to said annular ledges.

2. The cable splice enclosure of claim 1 wherein at least one of said compressible grommets has at least one opening for receiving at least one cable therethrough.

3. The cable splice enclosure of claim 2 wherein said at least one opening has at least one scale for forming a seal upon compression of said at least one compressible grommet.

4. The cable splice enclosure of claim 3 wherein said splice enclosure tube has external threads near both of said compressible ends and both of said outer shells have internal threads such that both of said outer shells can be threaded onto said compressible ends of said splice enclosure tube.

5. The cable splice enclosure of claim 4 wherein said outer shells and said splice enclosure tube are made of polymer-based material.

6. A butt-splice enclosure comprising, in combination:

a butt-splice enclosure tube having a compressible end, said compressible end containing an annular ledge;

a compressible grommet adapted to be inserted into said compressible end; and an outer shell adapted to be fastened to said compressible end, said outer shell having an inclined outer end portion that cooperates with said compressible end to radially compress said compressible end thereby radially compressing said compressible grommet, said inclined outer end portion holding said compressible grommet in abutted relation to said annular ledge.

7. The butt-splice enclosure of claim 6 wherein said compressible grommet has at least two openings for receiving at least two cables therethrough.

8. The butt-splice enclosure of claim 7 wherein at least one of said openings has at least one scale for forming a seal upon compression of said compressible grommet.

9. The butt-splice enclosure of claim 8 wherein said butt-splice enclosure tube has external threads near said compressible end and said outer shell has internal threads such that said outer shell can be threaded onto said compressible end.

10. The butt-splice enclosure of claim 9 wherein said outer shell and said butt-splice enclosure tube are made of polymer-based material.

* * * * *